Figure 1:
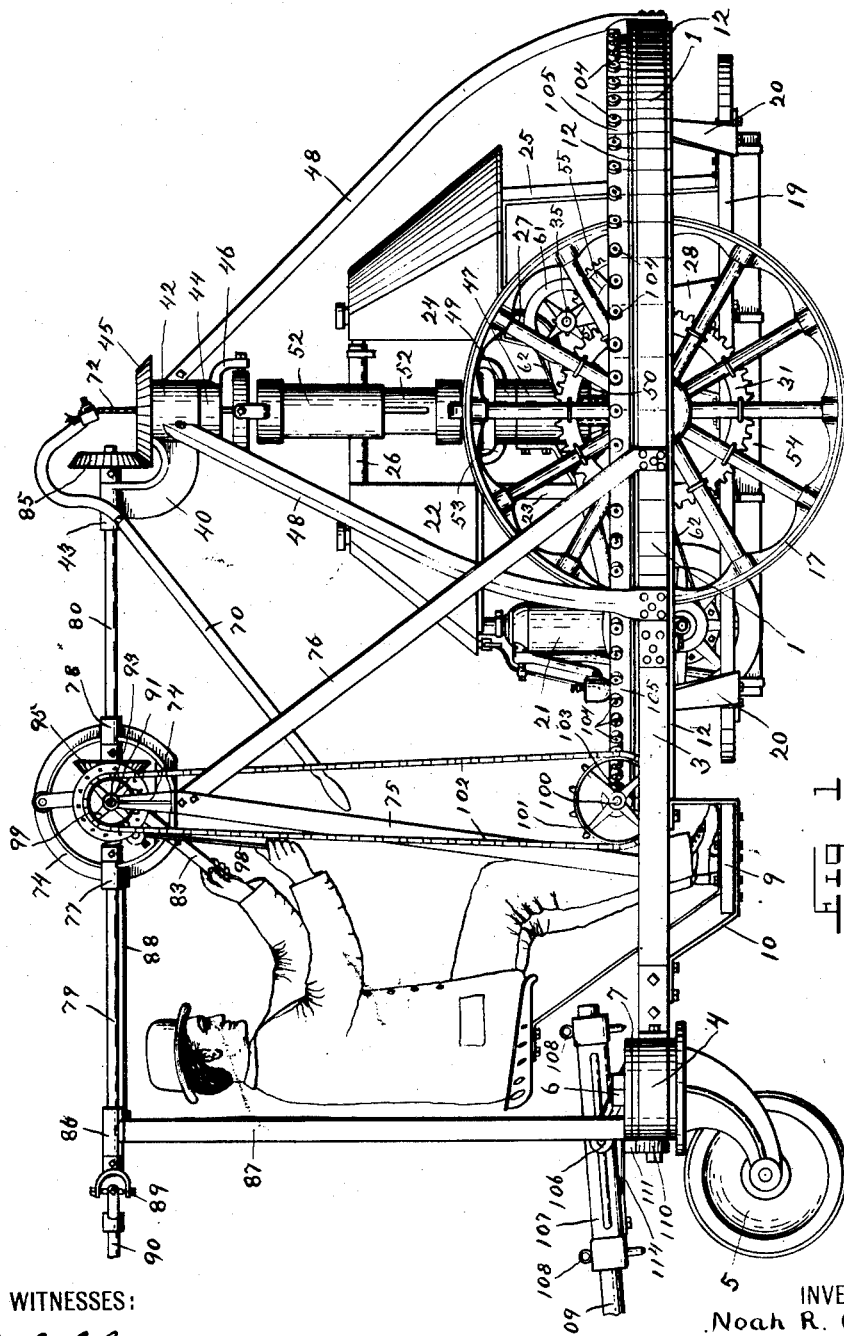

N. R. & R. GETZ.
TRACTION ENGINE.
APPLICATION FILED OCT. 23, 1909.

1,038,114.

Patented Sept. 10, 1912.

5 SHEETS—SHEET 1.

WITNESSES:
M. L. Lefevre,
B. P. Faltin.

INVENTORS
Noah R. Getz,
Rohrer Getz,
BY
John J. Thompson
ATTORNEY

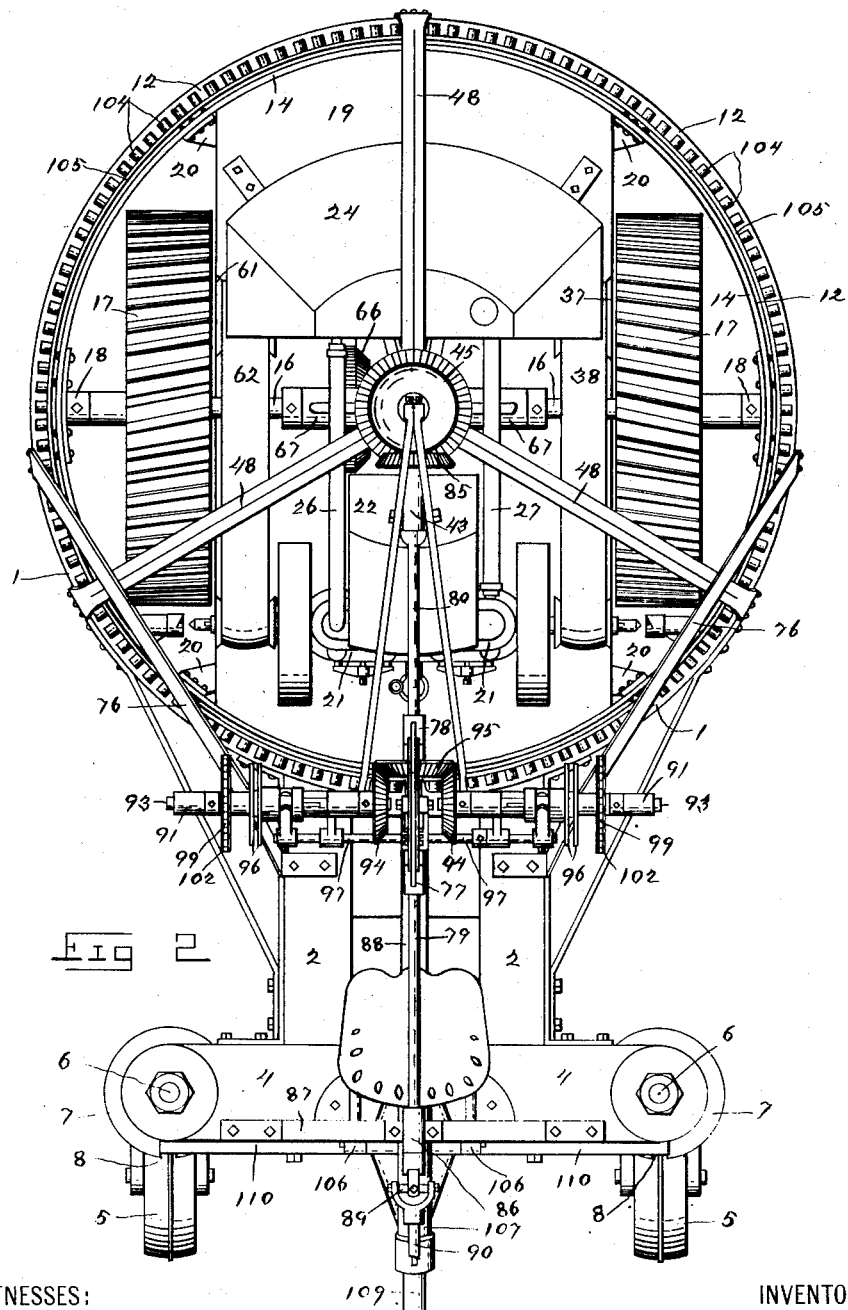

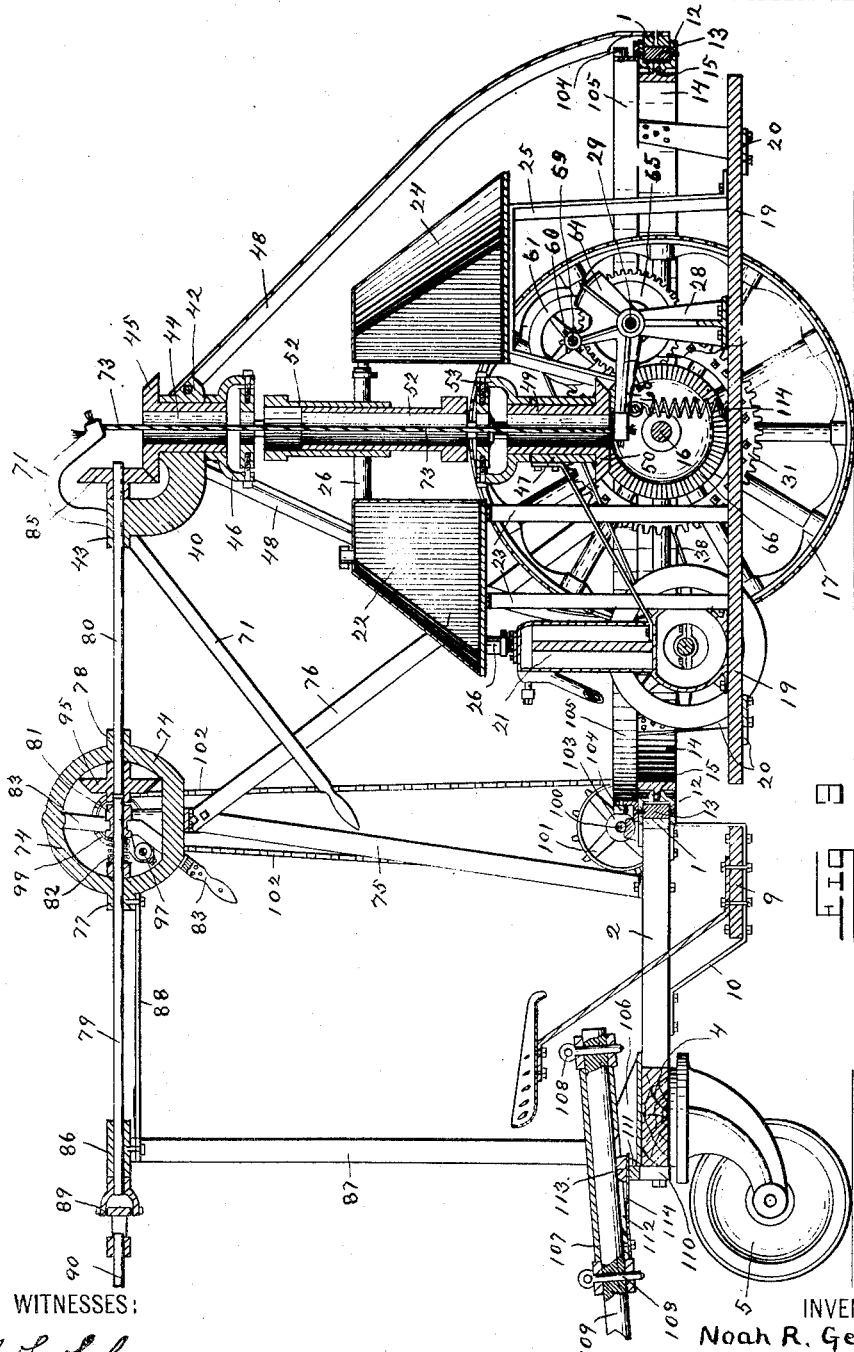

N. R. & R. GETZ.
TRACTION ENGINE.
APPLICATION FILED OCT. 23, 1909.
1,038,114.
Patented Sept. 10, 1912.
5 SHEETS—SHEET 4.
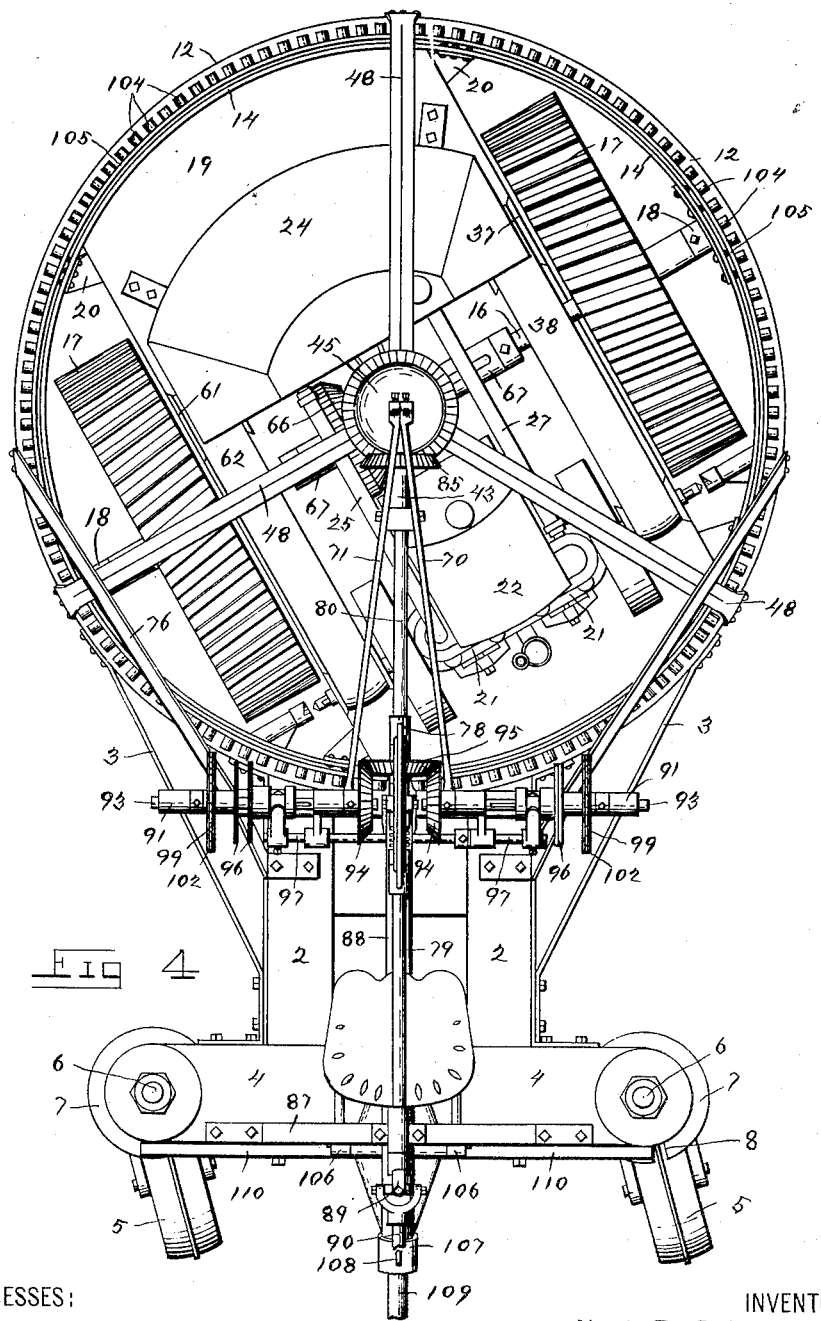
WITNESSES:
M. L. Lefevre.
B. P. Faltin.
INVENTORS
Noah R. Getz,
Rohrer Getz,
BY
ATTORNEY

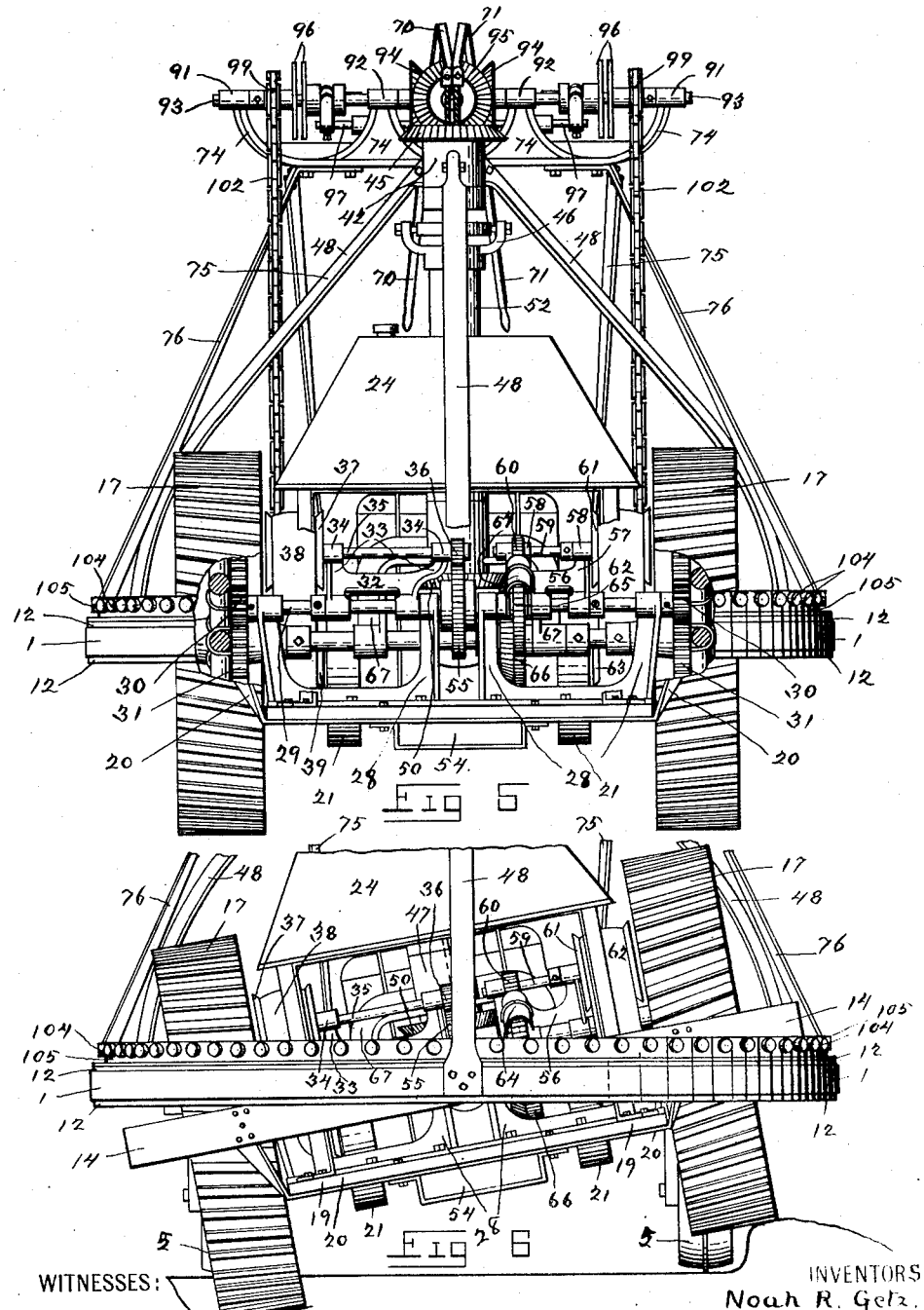

UNITED STATES PATENT OFFICE.

NOAH R. GETZ AND ROHRER GETZ, OF MANHEIM TOWNSHIP, LANCASTER COUNTY, PENNSYLVANIA.

TRACTION-ENGINE.

1,038,114.  Specification of Letters Patent.  Patented Sept. 10, 1912.

Application filed October 23, 1909. Serial No. 524,155.

*To all whom it may concern:*

Be it known that we, NOAH R. GETZ and ROHRER GETZ, citizens of the United States, residing at Manheim township, in the county of Lancaster and State of Pennsylvania, have invented certain new and useful Improvements in Traction - Engines, of which the following is a specification, reference being had therein to the accompanying drawing.

Our invention relates to a traction engine of that class which is intended for agricultural purposes, such as drawing harvesting machinery, and transmitting power thereto for the operation of the same while the traction engine itself is in motion, or it may be used for hauling trailers from place to place, and for transmitting power to machinery while in a stationary position.

The objects of the invention are to produce a traction engine of this class, that may be operated by any self-contained motive power, such as steam, gas or electricity, but we prefer a gasolene engine, as we have herewith shown. One of the main objects of the invention being to produce a machine of this class that is so constructed that it can make a short turn; the present styles of traction engines requiring a large space in which to make a complete turn and thus when used to haul a reaper in operation there is great loss of time in making the turns in the field, as the present styles cannot make a quick or sharp turn.

Another object of our invention is by the employment of novel construction and combination of parts to provide a device of this class in which the engine supporting frame and the body of the tractor are so constructed and combined that they will adapt themselves to all unevenness of the ground, over which they travel and on side hills, etc., and especially during the act of turning around.

Still another object is to provide mechanism whereby the operation of steering the tractor may be done by its own power and under perfect control of the operator; another special feature being that power may be directly conveyed to a detachable trailer (such as a reaper or mower) by a driving shaft provided with universal joints, and operated either when the tractor is standing still or in motion.

Another object is to provide novel means whereby the traction wheels of the tractor and the forward wheels of the trailer act as the wheels of one vehicle and the balancing or caster wheels of the tractor cease to act for guidance, while if there is no trailer attached, said caster wheels become locked from swiveling and help in the guidance of the machine.

With these and other objects in view our invention consists in certain construction and combination of parts as will hereinafter be fully described and claimed in the annexed specification and claims, and illustrated in the accompanying drawings which form a part of this application, and in which like figures of reference refer to corresponding parts in all of the views, but it is fully understood that while we have described our invention as herewith shown, that we do not confine ourselves to the exact design as shown, as slight changes may be made within the scope of the appended claims without departing from the spirit of the invention.

In the drawings:—Figure 1, is a side elevation of a traction engine showing our construction, a portion of the pole and driving shaft of a trailer being shown. Fig. 2, is a top plan view of the same with the wheels in position for straight travel. Fig. 3, is a vertical sectional view of Fig. 1, showing a detail view of the operating mechanism and with the muffler box removed. Fig. 4, is a top plan view, showing the position of the wheels when in the act of turning. Fig. 5, is an end elevation of Fig. 1, when operated on level ground, with part of the traction wheels and frame rings removed. Fig. 6, is a partial end elevation of the same when operated on uneven ground.

Referring to the drawings, the main frame is composed of the circular ring 1, which is rigidly secured to the bolsters 2, by the braces 3. Said bolsters 2, have secured thereto the cross beam 4, to the ends of which are mounted the swivel caster wheels 5, by the swivel bolts 6, in such a manner that the heads 7, of said casters are provided at a suitable point in their edge with a notch 8, which is engaged by a suitable catch (hereinafter fully described) to restrain them from swiveling. Said main frame is further provided with a bottom board 9, which is secured upon the brackets 10, and upon which is supported the operator's seat.

The motive power is mounted upon a supporting and steering frame which comprises a circular ring 12, which is U-shaped in cross-section; the flanges of which embrace the upper and lower edges of the ring 1, and which is further provided with rollers 13, which are mounted within said flanges at proper distances and which roll against the inner face of the ring 1, thus facilitating the turning of the ring 12, upon the ring 1. Within the ring 12, is mounted a third ring 14, by two pivots 15, which are directly opposite each other, so that said ring 14, may tip within the ring 12, and at the same time be revolved with and by the ring 12, within the ring 1, for the purpose hereinafter set forth, and by the novel means hereinafter described.

The main axle 16, upon which are rotatably mounted the traction wheel 17, has its ends secured in the sockets 18, which are rigidly secured to the ring 14, said axle being at right angles to the pivot points of said ring. Below said axle 16, and between the traction wheels 17, is placed the platform 19, which is secured to the inner ring 14, by the drop brackets 20, while upon said platform 19, is mounted a motor 21, which is fed from a fuel tank 22, situated above said motor 21, and supported upon the uprights 23; while forward of said fuel tank 22, is situated a water cooling tank 24, which is supported upon the uprights 25, and piped to the motor by the pipes 26, and 27, and under said platform is mounted an exhaust or muffler box 54.

Forward of the axle 16, and rotatably mounted in the bearing brackets 28, which are secured to the platform is a counter shaft 29, which is in two parts which are connected by the differential gear 55; upon the outer ends of said shaft 29, are secured the spur gears 30, which are in mesh with and drive the spur gears 31, which are secured to the inner side of the traction wheels 17. Upon said counter shaft 29, to one side of said differential gear 55, is swingably mounted a bracket 32, which is formed with the arms 33, which are provided with bearings 34, in the outer end thereof, and in which are mounted a short shaft 35, upon one end of which is secured a pinion 36, which is in mesh with the differential gear 55, and upon the other end a flanged pulley 37, which is driven by the belt 38, from the pulley 39, of the motor; said swinging bracket 32, being controlled by a novel device hereinafter described. Upon said counter shaft 29, and to the other side of said differential gear 55, is mounted another swinging bracket 56, which is formed with the bearing arm 57, containing the bearings 58, within which is rotatably mounted a shaft 59, upon the inner end of which is secured a pinion 60, and upon the other end of which is secured a pulley 61, which is driven by the belt 62, for the engine pulley 63. Upon the same half of the counter shaft 29, and within an arch 64, formed in the bearing bracket 56, is rotatably mounted an idler gear 65, which is in mesh with the pinion 60; while upon the axle 16, is rotatably mounted a combination gear 66, comprising a spur and bevel gear, the spur face of which is in mesh with and driven by the gear 65, and pinion 60.

Above the circular rings 1, 12, and 14, and in axial relation with the outer ring 1, is mounted a bearing frame 40, which is secured to said ring 1, by the brace-rods 48. Said member 40, is formed with a vertical bearing 42, and a horizontal bearing 43, in the body thereof. Rotatably mounted in said vertical bearing 42, is a tubular shaft 44, which is formed at its upper end with a bevel gear 45, and at its lower end with one member of a universal joint 46. Below said member 40, and in axial relation with the inner ring 14, is mounted a vertical bearing sleeve 47, which is formed with the yoke 67, supported upon the axle 16; said member 40, being further secured by the braces 48. Within said vertical bearing 47, is rotatably mounted a tubular shaft 49, upon the lower end of which is formed a bevel gear 50, which is in mesh with and is driven by the bevel face of the combination gear 66, which is rotatably mounted upon the axle 16; while the upper end of said tubular shaft 49, has secured thereon a universal joint 53, which is also secured to the lower end of a tubular telescoping shaft 52, the upper end of which is secured to the universal joint 46, in such a manner that the gear 45, will be revolved by said shaft 52, and the gear 50; while the bearing 47, may be inclined in any direction from the vertical as the vehicle is turned or propelled over uneven ground.

The controlling devices for operating both the swinging bracket 32, and its gears for rotating the traction wheels; and the swinging bracket 56, and its gears for rotating the telescoping shaft 52, comprise the lever-arms 68, and corresponding arm (not shown), which are integral with the brackets 32, and 56; and a pair of goose neck hand-levers 76, and 71, which are pivoted upon the bearing frame 40; while the ends of the goose necks 70, and 71, are attached to the upper end of the flexible cables 72, and 73, which have their lower ends secured to the arm 68, and corresponding arm, respectively; and in this manner said arms may be raised or lowered by the action of the tension springs 114, and in such a way as to swing the belt pulleys 37, and 61, so as to tighten the belts 38, and 62, so that they will transmit the power from the engine, or the belts in this way may be slackened so that there will be no power transmitted by said belts.

The turning or steering mechanism comprises a bearing frame 74, which is mounted to the rear of the frame 40, and secured upon the upright supports 75, and 76. Said frame 74, being formed with the bearings 77, and 78, within which are rotatably mounted the shafts 79, and 80; said shafts 79, and 80, being connected together by a clutch 81, which is kept in normal engagement by the spring 82, and which may be disengaged by the hand-lever 83. The forward end of the shaft 80, is mounted in a bearing 43, formed in the frame 40, and has secured thereon a bevel gear 85, which is in mesh with and driven by the bevel gear 45, and the rear end of the shaft 79, runs in a bearing 86, which is supported above the rear of the vehicle by the supports 87, and brace 88; while said shaft 79, is connected by a universal joint 89, to a shaft 90, that transmits power to operate the trailer (not shown). The frame 74, is further provided with the bearings 91, within which are rotatably mounted the transverse shafts 93, which have secured upon their inner ends the bevel gears 94, which are in mesh with and are rotated by a bevel gear 95, secured upon the shaft 80. The shafts 93, are further provided with the friction disk clutches 96, which are operated by the sliding rod 97, and the hand-lever 98; while near the outer ends of said shafts 93, are secured the sprocket wheels 99, which are rotated by said disk clutches 96, revolving in opposite directions as either clutch is engaged, but the sprocket wheels 99 may be both idle at the same time and can never both be operated at the same time.

Upon the bolster 2, and adjacent to the ring 12, is mounted a transverse shaft 100, upon the ends of which are secured sprocket wheels 101, which are driven by chains 102, from the sprocket wheels 99; while secured upon said shaft 100, is a worm 103, which engages a set of rollers 104, which are mounted upon the outer face of a flanged ring 105, which is secured upon the ring 12, and in this manner the rings 12, and 14, are revolved and the vehicle steered by the action of the worm 103, rotating in either direction as controlled by the hand-lever 98.

The mechanism for attaching the trailer to the tractor comprises a pair of bearing lugs 106, which are secured upon the cross-beam 4, and within which is pivoted a sleeve casting 107, in such a manner that it has a free vertical rocking movement, but no lateral movement. The tongue 109, of the trailer is detachably retained within said sleeve by the pins 108.

When it is desired to lock the caster wheels from swiveling, as is the case when no trailer is attached; this may be done in an automatic manner by the following device: To the rear of the cross-beam 4, are pivoted two levers 110, near their inner ends, so that the weight of their outer ends will normally keep them depressed, and a lug 111, is formed on their outer ends and is designed to engage with the notch 8, which is formed in the head of the caster wheels, and there is also a longitudinal slot 112, formed in the bottom of said sleeve 107, through which projects a lug 113, which is formed on the end of a spring 114, and secured to said sleeve 107, in such a manner that when the tongue 109, is in place, said lug 113, is forced downward and presses on the short ends of the levers 110, raising their outer ends up and releasing the caster wheels, which can then swivel.

Having thus described our invention what we claim as new and desire to secure by Letters Patent is:—

1. A traction engine of the class described, comprising a horizontal circular frame, a body frame secured thereto, supporting wheels pivotally secured to said body frame, a second circular frame or ring mounted in axial relation and rotatably within said circular frame, an inner circular frame or ring concentric with and diametrically pivoted within said second ring, and adapted to be rotated thereby, traction wheels mounted within said inner ring, a platform suspended from said inner ring, a power plant mounted upon said platform and adapted to operate said traction wheels, means for attaching a trailer to said traction engine, means for transmitting power to said trailer, means for rotating said second and inner rings within said circular frame by power, and means for controlling the propelling and power transmitting actions of said power plant.

2. A traction engine of the class described, comprising a circular frame, a rearwardly extending frame secured to said circular frame, supporting wheels swivelly mounted to the rear end of said extending frame, a second ring formed with outwardly extending flanges embracing and slidably mounted upon said circular frame, an inner ring concentric with and diametrically pivoted within and to said second ring, an axle mounted in said inner ring, traction wheels mounted upon said axle, a supporting platform suspended from said inner ring, a motor mounted upon said platform, a counter shaft mounted upon said platform, suitable gearing between said traction wheels and said counter shaft, means for revolving said counter shaft by said motor, a bearing frame mounted above said circular frame and attached thereto, a bearing frame mounted upon the axle and attached to said platform, a flexible telescoping shaft rotatably mounted in said bearing frames, and means for rotating said shaft by suitable mechanism mounted upon said counter shaft, means for revolving the second ring upon the circular frame, means for controlling the operation of the traction wheels, means for securing a trailer behind said traction engine, means for transmitting power to said trailer and means for controlling the transmission of said power.

3. In a tractor of the class described, in combination with a frame formed with a circular body and a rearwardly extending portion having swivel supporting wheels, of a power plant supporting frame composed of two concentric rings, the inner ring swingably pivoted within the outer ring, and the outer ring slidably mounted upon the circular body of the tractor frame, traction wheels mounted within and to said inner ring, a power plant carried by said inner ring and suitable mechanism for transmitting power from said power plant to said traction wheels, means for rotating said power plant supporting frame within said traction frame, and means for transmitting power to an attached trailer.

4. A self-propelled traction engine comprising a suitable traction frame, a motor and transmission supporting frame mounted within said traction frame and adapted to be revolved therein, means for guiding or reversing the travel of said traction engine by revolving the power plant within the traction frame, means for allowing of the tilting of said power supporting frame within the traction frame to compensate for uneven ground, means for attaching a trailer to said tractor frame, and means for operating said trailer by power transmitted from said tractor.

5. In a tractor of the class described, a power plant comprising main traction wheels suitably and rotatably mounted in the frame of said tractor, means for rotating said power plant within said tractor frame, means for allowing of the directing of said power plant from the perpendicular within said tractor frame, a vertical telescoping and semi-flexible hollow shaft mounted in said frame above said power plant and adapted to be driven thereby, means for transmitting power from said vertical shaft to the rear of said tractor, and an independent steering device.

In testimony whereof we affix our signatures in presence of two witnesses.

NOAH R. GETZ.
ROHRER GETZ.

Witnesses:
Wm. J. Coulter,
Mabel L. Lefevre.